(12) United States Patent
Luukko

(10) Patent No.: US 6,396,236 B1
(45) Date of Patent: May 28, 2002

(54) METHOD OF MINIMIZING ERRORS IN ROTOR ANGLE ESTIMATE IN SYNCHRONOUS MACHINE

(75) Inventor: Julius Luukko, Lappeenranta (FI)

(73) Assignee: ABB Oy., Helsinki (FI)

( * ) Notice: Subject to any disclaimer, the term of this patent is extended or adjusted under 35 U.S.C. 154(b) by 0 days.

(21) Appl. No.: 09/719,008

(22) PCT Filed: Jun. 9, 1999

(86) PCT No.: PCT/FI99/00501
§ 371 (c)(1),
(2), (4) Date: Dec. 7, 2000

(87) PCT Pub. No.: WO99/65137
PCT Pub. Date: Dec. 16, 1999

(30) Foreign Application Priority Data

Jun. 11, 1998 (FI) ................................... 981353

(51) Int. Cl.$^7$ ............................................. H02P 1/46
(52) U.S. Cl. .................... 318/700; 318/717; 318/721
(58) Field of Search ................... 318/700, 701, 318/721, 717, 718

(56) References Cited

U.S. PATENT DOCUMENTS

| | | | | |
|---|---|---|---|---|
| 5,097,190 A | * | 3/1992 | Lyons et al. ................. | 318/701 |
| 5,107,195 A | * | 4/1992 | Lyons et al. ................. | 318/701 |
| 5,467,025 A | * | 11/1995 | Ray ............................ | 324/772 |
| 5,525,886 A | * | 6/1996 | Lyons et al. ................. | 318/701 |
| 5,569,994 A | * | 10/1996 | Taylor et al. ................ | 318/700 |
| 5,796,228 A | | 8/1998 | Kojima et al. ............... | 318/605 |
| 5,844,385 A | * | 12/1998 | Jones et al. ................. | 318/254 |
| 5,982,117 A | * | 11/1999 | Taylor et al. ................ | 318/254 |
| 6,005,364 A | * | 12/1999 | Acarnley ..................... | 318/632 |
| 6,163,127 A | * | 12/2000 | Patel et al. .................. | 318/700 |

FOREIGN PATENT DOCUMENTS

| | | |
|---|---|---|
| JP | 9-47066 | 2/1997 |
| JP | 9-56199 | 2/1997 |
| JP | 10-080188 | 3/1998 |

* cited by examiner

Primary Examiner—Khanh Dang
Assistant Examiner—Rina I. Duda
(74) Attorney, Agent, or Firm—Dykema Gossett PLLC

(57) ABSTRACT

A method of minimizing errors in a rotor angle estimate in a synchronous machine the method comprising the steps of determining the stator flux ($\Psi^s_{sest}$) of the synchronous machine on the basis of the current model of the synchronous machine, determining the stator flux ($\Psi^s_{su}$') on the basis of the voltage integral and initial value ($\Psi^s_{su}(n-1)$) of the stator flux, and determining the rotor angle ($\theta_{est}(n)$) of the synchronous machine. The method also comprises the steps of determining an angle correction term ($\theta_k(n)$) on the basis of the determined stator fluxes ($\Psi^s_{sest}$, $\Psi^s_{su}$'), and adding the angle correction term ($\theta_k(n)$) to the determined rotor angle ($\theta_{est}(n)$) of the synchronous machine to obtain a rotor angle estimate ($\theta(n)$).

4 Claims, 2 Drawing Sheets

METHOD OF MINIMIZING ERRORS IN ROTOR ANGLE ESTIMATE IN SYNCHRONOUS MACHINE

BACKGROUND OF THE INVENTION

The invention relates to a method of minimizing errors in a rotor angle estimate in a synchronous machine, the method comprising the steps of
 determining the stator flux of the synchronous machine on the basis of the current model of the synchronous machine,
 determining the stator flux of the synchronous machine on the basis of the voltage integral and the initial value of the stator flux, and
 determining the rotor angle of the synchronous machine.

A synchronous machine generally consists of a stator provided with three-phase winding and a magnetized rotor. The rotor is typically magnetized either by means of permanent excitation or separate excitation. In permanent excitation the rotor is provided with permanent magnet blocks, which the magnetic field produced in the stator pulls towards itself, simultaneously rotating the rotor. Separate excitation of the rotor means that inside the rotor there are coils of wire to which power is applied. Thus the coils of wire in the rotor form magnetic poles in the rotor, which function according to the same principle as poles made of permanent magnets. The rotor of the synchronous machine may be a salient-pole rotor or a cylindrical rotor. In cylindrical rotor machines the rotor inductance is almost constant with respect to the stator, whereas in salient-pole machines the rotor inductance varies a lot because of changes in the air slot between the rotor and the stator, depending on the rotor position angle.

In speed-controlled synchronous machines it is important in respect of the function of the control system that the position angle of the machine's rotor is known as accurately as possible. Particularly in control methods based on direct control of the machine's stator flux the accuracy of angle determination has a considerable. influence on the accuracy of control. Usually a pulse encoder or an absolute sensor is used for determining the rotor position angle, and the information obtained from them can be used for determining the rotor angle.

The measurement result obtained from the angle sensor contains errors caused by at least two components that can be determined. The first one of the known components causing errors is incorrect initial angle, which is determined by an angle sensor. Various estimation algorithms have been presented for estimating the initial angle. However, the rotor can be initially turned in the desired direction, provided that the motor load allows this. The rotor is preferably turned so that it is in the same direction as the coil of a phase, for example. The rotor can be turned by supplying direct current to the desired phase, and thus the rotor turns in the desired direction. However, determination and correction of the initial angle by turning the rotor is often impossible because of the applications for which synchronous machines are used.

The error in the rotor angle may also result from delays in the discrete control system. If the rotor angle used for calculating the motor state has been determined in relation to time $\Delta T$ before calculating the motor model, this causes an additional error which is proportional to the angle frequency of the rotor according to the equation $\Delta\theta=\omega\Delta t$. In other words, the angle information determined as the rotor rotates becomes outdated before it is used for calculating the motor model. Thus the angle error caused by the delays is directly proportional to the angle speed of the rotor.

In motor control methods based on direct control of the torque caused by the stator current of the synchronous machine, the voltage to be applied to the stator is selected on the basis of a flux estimate $\psi^s_{su}$ which is based on the voltage integral and calculated on the basis of a short sampling period. The flux estimate $\psi^s_{su}$ is determined using integral theorem (1)

$$\Psi^s_{su} = \Psi^s_{su0} + \int_t^{t+\Delta t}(u^s_s - R_s i^s_s)dt$$

where $\psi^s_{su0}$ is the initial value of the flux, $u^s_s$ is the voltage to be applied, $i^s_s$ is the determined stator current and $R_s$ the stator resistance. In the complex plane plane the flux estimate $\psi^s_{su}$ is described by an oscillating circular path because the flux is controlled within certain hysteresis limits. If the flux estimate $\psi^s_{su}$ is equal to the real flux $\psi^s_s$ in the stator, the track of the phasor $i^s_s$ of the stator current to be generated is an origin-centred circle. Because of an erroneous voltage or resistance estimate the real flux $\psi_{ss}$ may, however, follow a track which differs from that of the estimate.

An estimate $\psi^s_{sest}$ based on the current model of the motor is used to stabilize the estimate based on the integral (2)

$$\psi^s_{sest}=f[L_1(\theta_r), L_2(\theta_r), \ldots, L_n(\theta_r), i_s, \psi_{71}(\theta_r)]$$

where $L_1(\theta_r), L_2(\theta_r), \ldots, L_n(\theta_r)$ represent the inductances that affect the stator flux, $\theta_r$ is the rotor angle and $\psi_f(\theta_r)$ is the flux, such as separate or permanent excitation, which is caused by the rotor and is independent of the stator current. The flux estimates produced by the models are compared with each other and the difference is updated in the estimate produced by the voltage model. As it appears from formula (2), in the synchronous machine the current model requires information of the rotor angle expressed in stator coordinates. If the angle information received from the pulse encoder or the absolute sensor is erroneous, then the flux estimate will also be erroneous, and consequently the update made in the voltage model is erroneous. Even though the above-mentioned manner provides a reliable estimate of the magnitude of the stator flux, the accuracy of the torque and speed control of operation is significantly impaired if the angle error in the rotor is considerable.

BRIEF DESCRIPTION OF THE INVENTION

The object of the present invention is to provide a method which allows to avoid the above-mentioned drawbacks and to estimate the rotor angle of a synchronous machine accurately, thus enabling reliable and accurate control of the operation of a synchronous machine. This object is achieved with a method according to the invention, which is characterized in that the method comprises the step of
 determining the correction term of the angle on the basis of the determined stator fluxes, and
 adding the correction term of the angle to the determined rotor angle of the synchronous machine to obtain a rotor angle estimate.

The method of the invention is based on the idea that an exact estimate is obtained for the rotor angle when a correction term $\theta_r$ is added to a determined rotor angle, the correction term being proportional to the difference of the direct-axis components of the stator fluxes determined on the basis of the current and voltage models of the synchronous machine.

The method of the invention provides a reliable estimate of the real rotor position angle of the synchronous machine by means of simple operations, which is important to obtaining accurate controllability of the synchronous machine. Thanks to its simplicity, the method is easy to implement and does not require additional measurement or parameter information.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
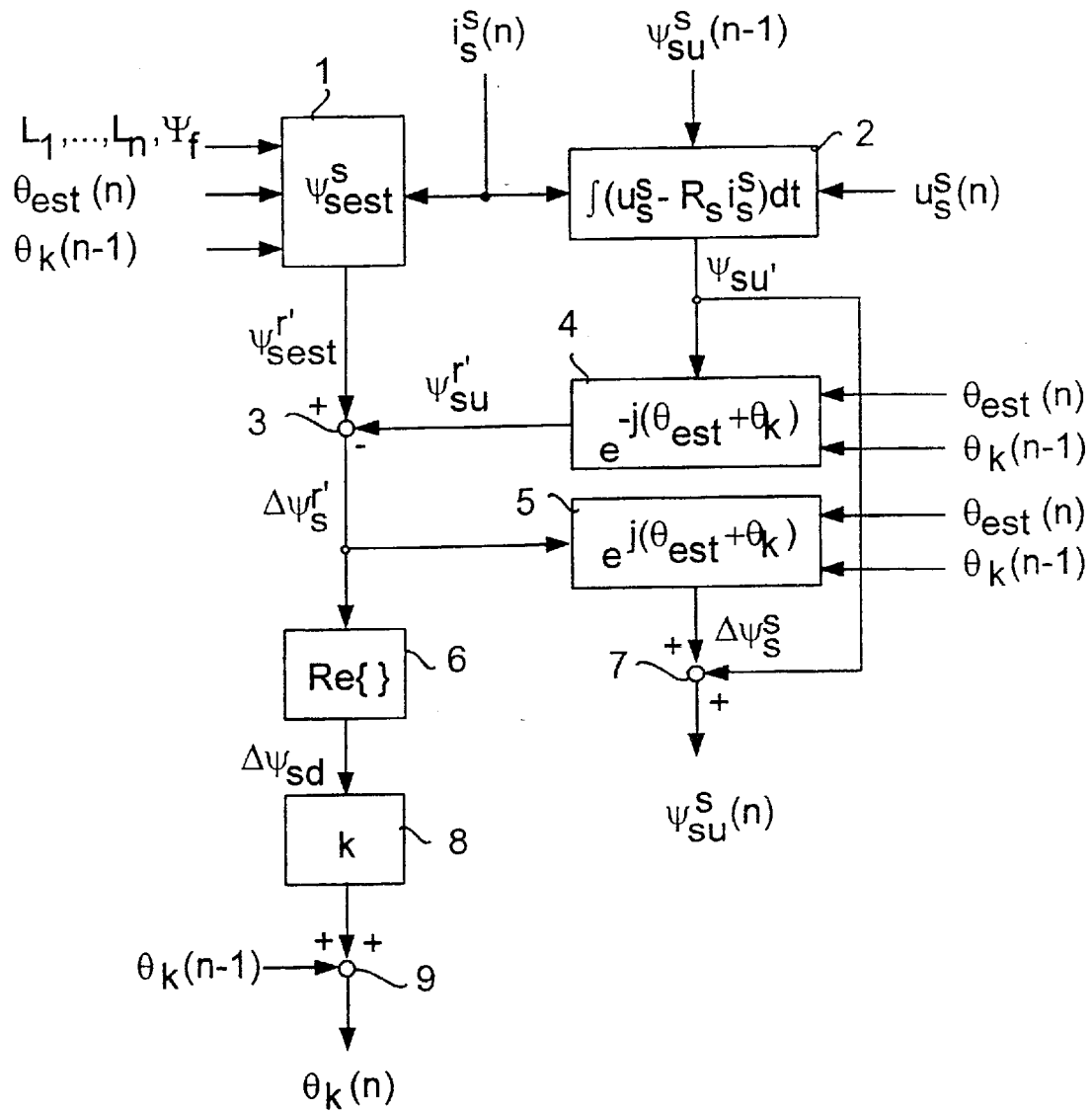
FIG. 1 is a block diagram of the method according to the invention.

According to FIG. 1, when estimating the stator flux of the synchronous machine based on the current model 1, parameter information is needed on the estimates of the magnitude of the inductances $L_1, L_2, \ldots, L_n$ that affect the stator flux. When the situation is viewed in a stationary system of coordinates, the magnitude of the inductances in question changes as the position angle $\theta_r$ of the rotor changes. Parameter information is also needed on the flux $\psi_f$, such as separate or permanent excitation of the rotor, which is independent of the stator current and caused by the rotor. When viewed in a stationary system of coordinates, the flux $\psi_f$ caused by the rotor also changes as the position angle of the rotor changes. Since the stator flux is also dependent on the stator current $i^s_s$, the magnitude of the current has to be determined. Thus the current model of the synchronous machine can be used for determining a stator flux estimate $\psi^s_{sest}$, which is a function of the above-mentioned variables.

The stator flux can also be determined on the basis of the voltage model 2 of the synchronous machine. In the voltage model the voltage active in the stator is integrated, which yields an estimate $\psi^s_{su}$ based on the voltage model. The magnitude of the voltage active in the stator is obtained by subtracting the voltage loss caused by the resistances in the stator coils when the current flows in the coils from the voltages to be applied to the stator coils. In the voltage model parameter information is needed on the magnitude of the resistance in the stator coils and initial value of the magnitude of the stator flux. In motor control methods based on direct control of the motor torque the voltage to be applied to the motor is usually selected on the basis of a flux estimate which is based on the voltage integral and calculated on the basis of a short sampling period. Stator flux estimates obtained in two different manners, i.e. estimates based on the current model and estimates based on the voltage model, are used as a basis for minimizing the rotor position angle and stabilizing the stator flux. Stabilization is carried out by comparing the estimates obtained through different models and the possible difference is updated in the voltage model estimate.

The stator fluxes determined according to the inventive method are used for determining an angle correction term, which is added to the measured rotor angle estimate. According to a preferred embodiment of the invention, both stator flux estimates determined are transformed into estimated rotor coordinates when an angle correction term is determined. The current model block 1 in FIG. 1 comprises an element which transforms the coordinates, and thus the output of the current model block is a stator flux estimate $\psi^r_{sest}$ expressed in estimated rotor coordinates. A stator flux estimate $\psi^s_{su}$ which is expressed in stator coordinates and obtained in the output from the voltage model 2 is transformed into estimated rotor coordinates using a coordinate transformer 4. To be able to transform flux estimates into estimated rotor coordinates, one needs to know the rotor position angle. A sum of the rotor angle $\theta_r$ obtained as a measurement result from the angle sensor attached to the rotor and the angle correction term $\theta_k$ determined by the method of the invention or the initial value of the angle correction term is used as the position angle.

The stator flux estimates determined by both methods of the invention are vector variables. According to the method, a stator flux estimate $\psi^s_{su}$, determined on the basis of the voltage model is subtracted from the stator flux $\psi^r_{sest}$ determined on the basis of the current model. According to FIG. 1, the difference between the fluxes is provided by an adder 3. The estimate based on current model is connected to the positive input of the adder and the estimate based on the voltage model to its negative input. The output of the adder 3, i.e. the difference variable $\Delta\psi^r_s$ of the stator flux obtained as the difference of said estimates, is connected to the input of a transformer 6 and coordinate transformer 5.

The difference variable $\Delta\psi^r_s$ obtained from the adder 3 is also a vector variable, which comprises a real and an imaginary component. The transformer 6 removes the imaginary part from the difference variable $\Delta\psi^r_{su}$, and thus only the real part $\Delta\psi_{sd}$ of the difference signal is left over, which corresponds to the difference of the direct-axis components of the flux estimates of the current and voltage models in the system of estimated rotor coordinates.

The output of the transformer 6 is connected to the input of a multiplier 8. The multiplier 8 scales the real part $\Delta\psi_{sd}$ of the difference variable by multiplying it by a constant coefficient k, and thus the output of the multiplier can be provided with an amplified difference variable. The amplified difference variable obtained in the output of the multiplier 8 is added to the previous value $\theta_k(n-1)$ of the angle correction term by an adder 9 to obtain a new value $\theta_k(n)$ for the angle correction term. The angle correction term is used for determining the rotor position angle by adding the correction term to the rotor angle $\theta_{est}$ obtained from the measuring element determining the angle. The corrected estimate obtained in this way for the rotor position angle $\theta_n$ is accurate and enables more reliable control of the synchronous machine.

In a preferred embodiment of the invention a corrected stator flux $\psi^s_{su}$ is determined by adding the difference variable $\Delta\psi^s_{su}$ of the stator flux transformed into stator coordinates to the stator flux $\psi^s_{su}$ based on the voltage model by the adder 7. The difference variable of the stator flux is transformed into stator coordinates by the coordinate transformer 5. The sum of the rotor angle obtained in the measurement information and the angle correction term is used in the transformation. The corrected stator flux $\psi^s_{su}$ obtained from the adder 7 is used for controlling the synchronous machine as illustrated in FIG. 2.

The method of the invention can be used in the manners described above when the synchronous machine is in operation, in which case the angle correction term is determined continuously. According to a preferred embodiment of the invention, the method can also be used for identifying the necessary angle correction before the machine is actually used. In that case one or more angle speeds of the synchronous machine are used for determining an angle correction term according to the invention. After this correction terms related to all other angle speeds of the machine can be determined on the basis of the determined correction terms. The determined correction terms related to other angle speeds are stored so that the correct correction term can be added to the measured position angle as the synchronous machine rotates at a certain angle speed. Thus the rotor position angle can be determined in a reliable and simple manner. Determination of the correction terms related to all speeds on the basis of one or more correction terms determined according the methods is feasible because the error in the position angle is linear to the angle speed due to the principles according to which errors occur. Thus the correction terms related to all possible angle speeds are obtained by interpolating the determined correction terms.

Figure 2:
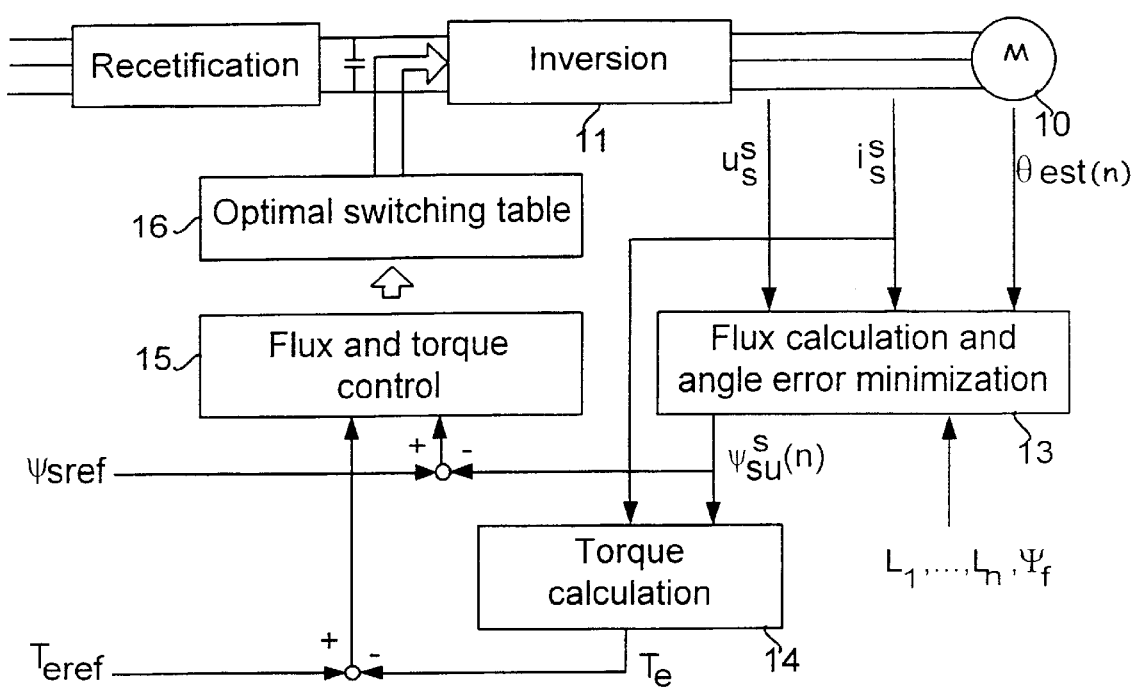
FIG. 2 illustrates how the method according to the invention is related to operations of the synchronous machine drive.

According to the schematic illustration of the invention in FIG. 2, the angle error is minimized and the flux calculated in block 13. FIG. 2 illustrates how minimization of the angle error is related to the rest of the motor control system. The method illustrated in the figure uses a control solution based on direct control of the motor torque. The angle error minimization block 13 receives in its input information on the voltage used, magnitude of stator currents and measurement information from the angle sensor. The magnitude of the machine inductances is also included in the parameter information. The output of the angle error minimization block is a stator flux which has been corrected using the minimization method of the invention.

The torque $T_e$ acting on the motor shaft is calculated in a torque calculation block 14 on the basis of the measured stator currents and the stator flux obtained in the output from block 13. Both the torque $T_e$ generated by the motor and the flux $\psi^s_{su}(n)$ are compared to the corresponding reference values $T_{eref}$ and $\psi_{sref}$ in order to obtain the difference variables. In control block 15 the flux and the torque are controlled to keep up the stator flux and the torque. Voltage instruction suitable for a given situation are chosen from an optimal switching table on the basis of the output of the control block to control the switches of the inverter 11 connected to the stator coils of the motor so that the desired values of the stator flux and the torque are achieved.

It will be obvious to a person skilled in the art that as the technology advances, the inventive concept may be implemented in several different ways. Thus the invention and its embodiments are not restricted to the examples described above, but they may vary within the scope of the claims.

I claim:

1. A method of minimizing errors in a rotor angle estimate in a synchronous machine, the method comprising the steps of:

determining a stator flux ($\psi^s_{sest}$) of the synchronous machine on the basis of a current model of the synchronous machine, determining a stator flux ($\psi^s_{su'}$) on the basis of a voltage integral and initial value ($\psi^s_{su'}(n-1)$) of the stator flux, determining a rotor angle ($\theta_{est}(n)$) of the synchronous machine, determining an angle correction term ($\theta_k(n)$) on the basis of the determined stator fluxes ($\psi^s_{sest}$, $\psi^s_{su'}$), and adding the angle correction term ($\theta_k(n)$) to the determined rotor angle ($\theta_{est}(n)$) of the synchronous machine to obtain the rotor angle estimate ($\theta(n)$).

2. A method according to claim 1, wherein determination of the angle correction term also comprises the steps of:

transforming the determined stator fluxes into estimated rotor coordinates using the sum of the determined rotor angle ($\Theta_{est}(n)$) and an initial value of the angle correction term ($\theta_k(n-1)$) in the transformation of the coordinates, subtracting a stator flux ($\psi^r_{su'}$) based on a voltage model and transformed into rotor coordinates from a stator flux ($\psi^r_{sest}$) based on the current model and transformed into estimated rotor coordinates to obtain a difference variable ($\Delta\psi^r_s$) of the stator flux, taking a real part ($\Delta\psi_{sd}$) from the difference variable ($\Delta\psi^r_s$) of the stator flux, multiplying the real part ($\Delta\psi_{sd}$) of the stator flux to obtain a difference variable amplified with an amplifying coefficient (k), and adding the amplified difference variable to the initial value ($\theta_k(n-1)$) of the angle correction term to obtain an updated angle correction term ($\theta_k(n)$).

3. A method according to claim 1, wherein the method further comprises the step of:

determining a corrected stator flux ($\psi^s_{su}(n)$) by adding the difference variable ($\Delta\psi^s_s$) of the stator flux transformed into stator coordinates to the integrated stator flux ($\psi^s_{su'}$) whereby the corrected stator flux ($\psi^s_{su}(n)$) is used as the next initial value of the stator flux for determining the voltage integral of the stator flux.

4. A method according to claim 1, wherein the method comprises the steps of:

determining an angle correction term on the basis of one or more angle speeds of the motor, forming and storing angle correction terms related to other angle speeds on the basis of the correction terms determined using one or more angle speeds of the motor, selecting an angle correction term which is dependent on the angle speed during the operation of the synchronous machine, and adding the selected angle correction term to the determined rotor angle to obtain a rotor angle estimate.

* * * * *